United States Patent [19]

Tano et al.

[11] Patent Number: 4,668,068
[45] Date of Patent: May 26, 1987

[54] AUTOMATIC FOCUS ADJUSTMENT APPARATUS

[75] Inventors: Touru Tano, Kakogawa; Akihiro Fujita, Mie; Takayuki Utsumi, Gifu, all of Japan

[73] Assignee: Kowa Company Ltd., Nagoya, Japan

[21] Appl. No.: 843,073

[22] Filed: Mar. 24, 1986

[51] Int. Cl.$^4$ .............................................. G03B 3/10
[52] U.S. Cl. ................................................... 354/403
[58] Field of Search ......................................... 354/403

[56] References Cited
U.S. PATENT DOCUMENTS

4,613,225  9/1986  Kawabata ..................... 354/403

*Primary Examiner*—Michael L. Gellner
*Attorney, Agent, or Firm*—Robert E. Burns; Emmanuel J. Lobato; Bruce L. Adams

[57] ABSTRACT

An automatic focus adjustment apparatus adapted for use with cameras includes an automatic focusing means for shifting an imaging objective for automatic focusing in response to an output signal from a pair of photodetectors which receives light radiated from a light emitting element and then reflected from a subject to be photographed. The light energy from the light emitting element is controlled by a radiance control means in such a manner that it radiates a diminished energy for a period of time and then restores its light energy.

1 Claim, 8 Drawing Figures

AUTOMATIC FOCUS ADJUSTMENT APPARATUS

BACKGROUND OF THE INVENTION

1. Field of the Invention

The present invention relates to an automatic focus adjustment apparatus, and more particularly to an automatic focus adjustment apparatus provided with an optical system for directing into a photo-detector means the reflected light portion of the light radiated from a light emitting portion to a subject to be photographed, which performs focus adjustment by shifting the imaging optical system along the optical axis of same in response to an output signal of the above mentioned photo-detector means.

2. Description of the Prior Art

In order to perform automatically the adjustment of imaging optical systems, that is, the adjustment of the focus of cameras, television cameras, or the like, there are known in the art, methods in which light is radiated at a subject to be photographed, the light reflected therefrom is received by a photo-detector means, a photoelectric conversion is made, whereupon a motor is driven in response to the resulting output signal, and the objective of the imaging optical system is shifted. In other words, a so-called active system is well-known and practiced in the art, as seen, for example, from Japanese Patent Specification Nos. 809/84, or 15244/85.

Figure 1:
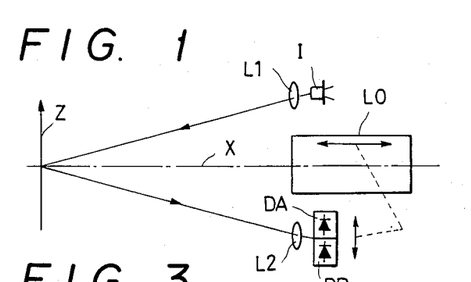
FIG. 1 is an explanatory diagram showing the principle of auto-focus adjustment according to an active method known in the prior art.

An auto-focus adjustment mechanism of a well-known and exemplary active system is shown in FIG. 1.

In FIG. 1, the symbol L0 indicates a focusing objective in an imaging optical system which is moved along an optical axis X by a driving means such as a motor or the like. Two lenses L1 and L2 are arranged on both sides of the objective L0, behind which are provided respectively a light source I and a pair of photodiodes DA and DB. The photodiodes DA and DB are engaged to the movement of the objective L0 and are moved in a direction virtually at a right angle to the optical axis X.

Auto-focus adjustment is performed with the above configuration in a manner described below.

Light from the light source I is radiated through the lens L1 to a photo-subject Z along the optical axis X, and the light reflected therefrom is directed through the lens L2 to the two photodiodes DA and DB. The light from the light source I is radiated at a fixed radiation angle, thus the position of the photodiodes receiving the reflected light from the photo-subject varies at a right angle with the optical axis in relation to the distance of the photo-subject Z.

Therefore, if the cooperating movement of the objective L0 and the two photodiodes DA and DB are coordinated such that equal quantities of reflected light return to said pair of photodiodes DA and DB when the objective L0 is properly focused on a photo-subject, then it becomes possible to effectuate focus adjustment automatically by checking the output of the photodiodes DA and DB.

Prior art active auto-focus adjustment systems as described above have the drawback that when the camera to photo-subject distance is great, or when a source of light disturbing the light signal of the light source I is in front of the imaging optical system, the signal to noise ratio in the reflected light detected by the photodiodes becomes degraded, and normal focus adjustment cannot be performed.

When the signal to noise ratio is degraded, despite the camera being in an in-focus condition and the positions of the camera and photo-subject not changing, there are cases in which the objective will shift due to erroneous disturbing light, and unseemly problems will occur such as obscuring of focus and changes in image size.

In view of the above problems, improved prior art autofocus adjustment apparatus have been advanced which can reliably perform auto-focus adjustment operations even in the presence of disturbing light or in instances when camera to photo-subject distance is comparatively great.

An explanation of such an exemplary prior art will be given below in connection with the drawing shown in FIG. 2.

Figure 2:
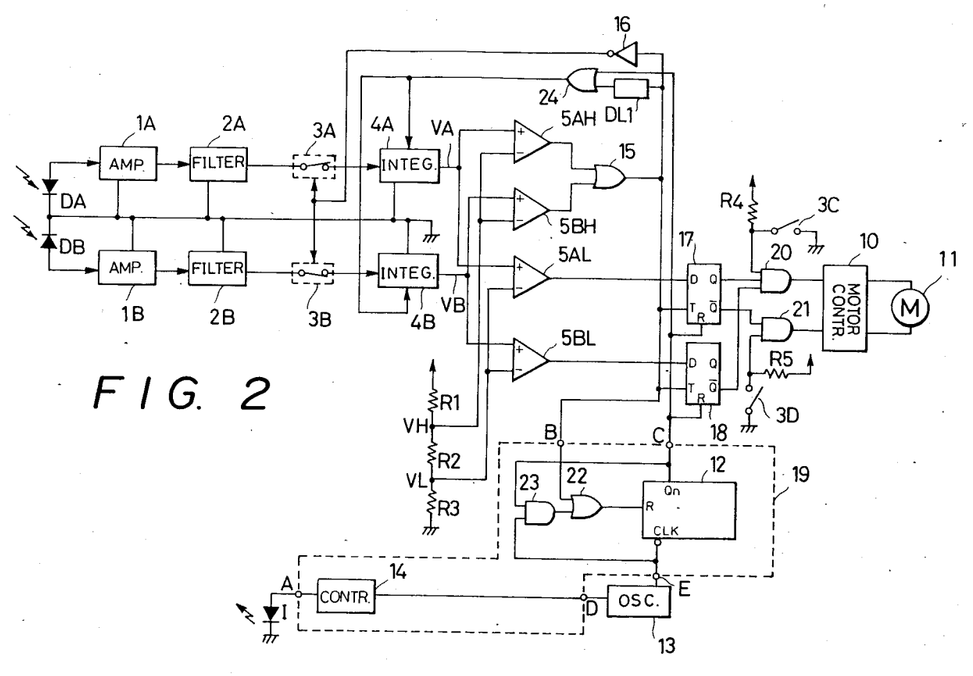
FIG. 2 is a circuit diagram showing the arrangement of a prior art auto-focus adjustment circuit.

In FIG. 2, the symbols DA and DB indicate adjacently arranged photodiodes for detecting reflected light. The output of the photodiodes DA and DB are amplified by amplifiers 1A and 1B, respectively, and then sent to filters 2A and 2B, respectively.

The light source I is driven at an oscillation frequency of a reference oscillator 13, through a point D via a light intensity controller 14 equipped with a driver. In order to prevent the interference of incident light, the frequency chose preferably differs from the frequency of commercial power supplies used for indoor lighting systems.

Accordingly, the filters 2A and 2B are provided such that only signals in the range of the frequency of the light emitted from the light source I are allowed to pass through. The ouputs of the filters 2A and 2B are input to integrators 4A and 4B via switches 3A and 3B, whose opening and closing are accomplished electrically.

The output voltage VA of the integrator 4A is input to the (+) terminals of comparators 5AH and 5AL.

Also, the output voltage VB of the integrator 4B is input to the (+) terminals of comparators 5BH and 5BL.

A threshold value voltage which divides power supply voltage by means of serially connected resistors R1-R3 is supplied to the (−) terminals of the comparators 5AH and 5AL.

A voltage VH at the connection point of the resistors R1 and R2 is supplied as a threshold value voltage to the comparators 5AH and 5BH. A voltage VL at the connection point of the resistors R2 and R3 is supplied to the comparators 5AL and 5BL.

These voltages VH and VL are, as will be described below, determined depending upon the focal precision required.

The outputs of the comparators 5AH and 5BH are connected to the inputs of an OR-gate 15. The output of the OR-gate 15 is input to an inverter 16, a delay circuit DL1 comprising a mono-stable multi-vibrator, etc., the trigger terminals of D flip-flops 17 and 18, and the connection point B of a block 19. In other words, when one or the other of the comparators 5AH and 5BH becomes high level, a high level pulse is output, and this pulse triggers the D flip-flops 17 and 18.

The output of the comparators 5AL and 5BL are applied respectively to the data inputs of the D flip-flops 17 and 18. The non-inverting output of the D flip-flop 17 and the inverting output of the D flip-flop 18 are input to the AND-gate 20, and the inverting output of the D flip-flop 17 is input to the AND-gate 21. The third input terminal of the AND-gate 20 and the second input terminal of the AND-gate 21 are connected to power supply voltage through resistors R4 and R5, and the electrical potentials of both of these input terminals are controlled by switches 3C and 3D which are normally open. These switches 3C and 3D are arranged at either edge of the travelling range of the focusing objective L0, and when the objective moves to the position of infinite distance or maximum closeness, said switches 3C and 3D suppress both of the AND-gate 20 and 21, whereupon the movement of the objective by a motor 11 is terminated.

A motor controlling circuit 10 bi-directionally drives, in response to the output of the above stated AND-gates 20 and 21, the motor 11 which moves the objective L0. The motor 11 is predeterminedly driven to move depending on the amount of light incident on the photodiodes DA and DB in the direction which will equalize the above-mentioned amounts.

The connection point B of block 19 is connected to one terminal of an OR-gate 22, and the output of the OR-gate 22 is connected to the reset terminal of a counter 12. This counter 12 advances according to the fall of the output clock pulse of the above stated reference oscillator 13. The clock pulse output of the reference oscillator 13 passes connection point E and is connected to the clock input of the counter 12, and is concurrently connected to the bottom input terminal of an AND-gate 23. The output of the AND-gate 23 is connected to the remaining input of the OR-gate 22. An output Qn of the counter 12 is connected to the top input terminal of the AND-gate 23.

The output Qn of the counter 12 passes the connection point C and resets the D flip-flops 17 and 18, and is concurrently connected to one input of the OR-gate 24. The delay circuit DL1 is connected to the other input of the OR-gate 24, and the output of said OR-gate 24 resets the integrators 4A and 4B. The output of the inverter 16 works to open the switches 3A and 3B.

An explanation of the operation of the above described arrangement will be given below.

Figure 3:
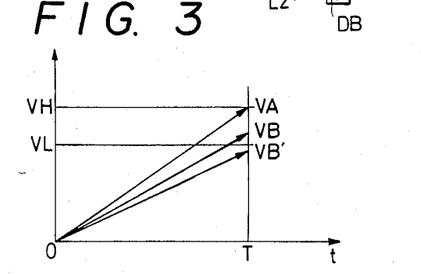
FIG. 3 is a graph explaining the operation of the circuit in FIG. 2.

The photodiodes DA and DB produce an output signal depending upon the amount of light received, and from this output signal only a component of a frequency matching the light emitting from the light source I is selected out by the filters 2A and 2B and subsequently sent through the normally closed switches 3A and 3B to the integrators 4A and 4B. The output voltages of the integrators 4A and 4B are, as shown in FIG. 3, enhanced in accordance with the amount of light received after the commencement of measuring.

A case will be explained below in which the output voltages of the integrators 4A and 4B are increased over a time t in a manner indicated by the symbols VA and VB'.

Since the amount of light received by the photodiodes DA is greater, the integrator voltage 4A at time T reaches the threshold value VH of the comparator 5AH. Accordingly, the comparator 5AH inverts and a high level is output from the OR-gate 15, whereupon the D flip-flops 17 and 18 are triggered. At this time, the data input of the D flip-flop 17 is at high level since the voltage VA has, as may be seen in FIG. 3, already exceeded the threshold value VL of the comparator 5AL. Also, the data input of the D flip-flop 18 is at low level since the voltage VB at this time has not yet reached the voltage VL.

Thus, with the triggering of the flip-flops, the non-inverting output of the D flip-flop 17 becomes at high level, and the non-inverting output of the D flip-flop 18 becomes at low level. Needless to say, since the respective inverting outputs produce voltages opposite thereto, the inputs of the AND-gate 20 are all high level, and the inputs of the AND-gate 21 are high level and low level. Therefore, the AND-gate 20 outputs a high level signal and the AND-gate 21 outputs a low level signal.

Accordingly, the motor controlling circuit 10 drives the motor 11 in such a manner as to increase the amount of light received by the photodiode DB, thus shifting the objective and the photodiodes. In the event the balance of received light is opposite to the present example, the objective is shifted in the direction opposite that stated above according to an exactly similar operation.

The integrators 4A and 4B are reset by the switches 3A and 3B via the inverter 16 simultaneously with the triggering of the D flip-flops 17 and 18. Following the elapse of a time delay established by the delay circuit DL1, the value of each integrator is reset to its initial value by the OR-gate 24. The counter 12 inside the block 19 is also reset by the OR-gate 22.

This counter 12 establishes the maximum time period for integration, and after reset in the above manner following completion of the measuring period, if upon the counting of a fixed number of clock pulses of the reference oscillator 13 the counter 12 has not yet been reset, it will be determined that a sufficient amount of measured light could not be received, and the counter 12 will generate a short pulse, thereby resetting the D flip-flops 17 and 18, and the integrators 4A and 4B. Simultaneously, the counter 12 will reset its own value via the AND-gate 23 in synchronization with the clock pulse.

In the event that the integrator values increase in the manner of symbols VA and VB, when the voltage VA reaches the voltage VH, the comparators 5AL and 5BL are both already outputting at high level, and thus the non-inverting outputs of the D flip-flops 17 and 18 are concurrently at high level, and the inverting outputs are concurrently at low level.

Therefore, the AND-gate 20 and 21 are concurrently isolated, the motor 11 is suspended, and the movement of the objective is restrained. Accordingly, when the output integrator value of one or the other of the photodiodes DA and DB has reached the voltage VH, in the event that the other integrator value is the same or higher than the voltage VL, it means that an in-focus condition has been ascertained.

Figure 5:
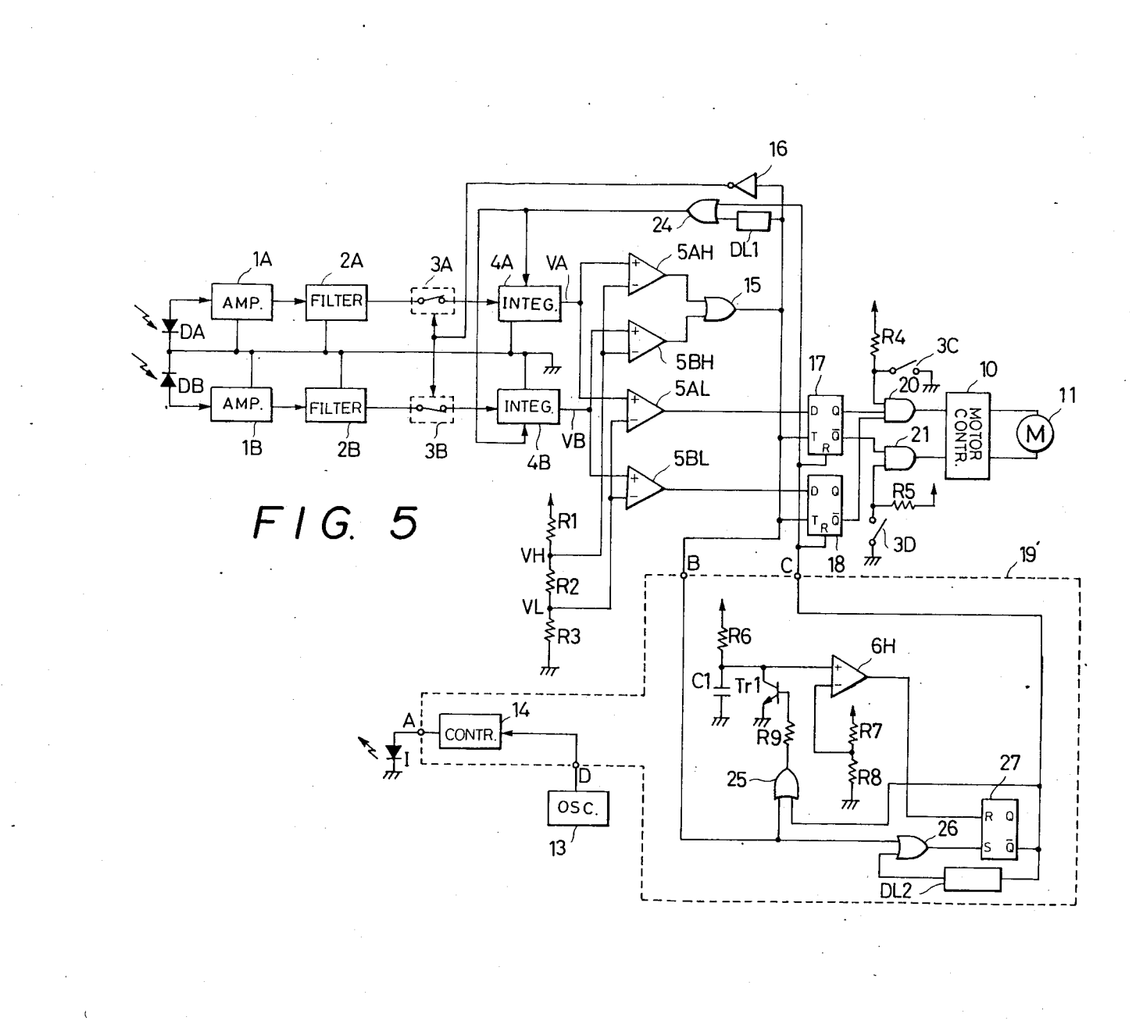
FIG. 5 is a circuit diagram of another embodiment of a prior art auto-focus adjustment circuit.

FIG. 5 shows another embodiment according to prior art in which the block 19 in FIG. 2 is replaced by a block 19'. In FIG. 5, the non-inverting input of a comparator 6H is connected to the connection point of a resistor R6 and a capacitor C1. The collector of a transistor Tr1 is also connected to this connection point. The other end of the resistor R6 is connected to power supply voltage, and the other end of the capacitor C1 is connected to ground.

The connection point of resistors R7 and R8 which divide power supply voltage is connected to the inverting input of a comparator 6H. The output of the comparator 6H is connected to the reset input of an RS flip-flop 27.

The point B is connected to the left and top inputs of OR-gates 25 and 26, respectively. The output of the OR-gate 26 is connected to the set input of the RS flip-flop 27. The output of the OR-gate 25 is connected to the base of the transistor Tr1 through a resistor R9. The emitter of the transistor Tr1 is connected to ground.

The inverting output of the RS flip-flop 27 is connected to the right input of the OR-gate 25 and to a point C, and concurrently through a delay circuit DL2 to the bottom input of the OR-gate 26.

An explanation of operation will be given below.

When one or the other of the outputs VA and VB of the integrators 4A and 4B reach the voltage VH, a positive pulse appearing at the point B in a manner similar to that of the above stated embodiment passes through the OR-gate 25 and the resistor R9 and turns on the transistor Tr1, whereupon the capacitor C1 discharges. At the same time, the pulse passes through the OR-gate 26 and sets the RS flip-flop 27.

When the pulse from the point B is gone, the capacitor C1 begins charging through the resistor R6.

The electrical potential of the capacitor C1 is compared by the comparator 6H to the electrical potential of the connection point of the resistors R7 and R8, and at the point the electrical potential of the capacitor C1 exceeds the electrical potential of the connection point, the comparator 6H produces a signal at high level and resets the RS flip-flop 27.

The inverting output of the RS flip-flop 27 produces a signal at high level, resets, via the point C, the D flip-flops 17 and 18, and the integrators 4A and 4B, and concurrently turns on the transistor Tr1 via the OR-gate 25 and the resistor 9, whereupon the capacitor C1 discharges. Further, said inverting output resets the RS flip-flop 27 via the delay circuit DL2 and the OR-gate 26.

The time delay of the delay circuits DL1 and DL2 are set at a length sufficient to allow the discharge of the capacitor C1.

Accordingly, the maximum integrating period is determined by the time constant of the resistor R6 and the capacitor C1 and the division ratio of the resistors R7 and R8.

Prior to the elapse of the maximum integrating period, in the event that the output VA or VB of the integrator 4A or 4B reaches the reference electrical potential VH, a positive pulse appears at the point B which turns off the transistor Tr1 via the OR-gate 25 and the resistor R9, whereupon the capacitor C1 discharges, and then subsequently recommences charging. Thus, the pulse does the work of a mono-stable multi-vibrator with precise retriggering capability. Accordingly, a maximum integrating period is established afresh.

In the above described two embodiments in prior arts, the execution of normal auto-focus adjustment is possible even in the event there is a certain level of disturbing light, or the photo-subject is at a comparatively great distance, however with recent video cameras and the like, there is a trend toward the attachment of high magnification zoom lenses, in which event there is a need for an auto-focus adjustment system capable of range finding to great distances.

As a result, a necessity is generated to radiate a stronger light signal and increase the amplification level of the amplifier used to amplify the received light reflected from the photo-subject, however, in the event that a photo-subject is at a great distance, although it is possible to execute accurate auto-focus adjustment by radiating the above described stronger light signal and by using a signal of higher amplification level following a photoelectric conversion of the received reflected light, a problem arises in that in the event a close range photo-subject of a high reflexibility is chosen, the output of the amplifier becomes saturated and accurate auto-focus adjustment becomes impossible to perform.

Further, in recent years, the trend toward low energy consumption in all fields has advanced rapidly and there is a trend toward lower power supply voltages, as a result of which it has become difficult to fully utilize the dynamic range of an amplifier.

SUMMARY OF THE INVENTION

It is therefore an object of the present invention to provide an automatic focus adjustment apparatus capable of effecting an accurate and stable focus adjustment at low level power consumption.

In accordance with the present invention, an automatic focus adjustment apparatus includes an automatic focusing means for shifting an imaging optical system along its optical axis in response to an output signal from a pair of the photo-detector means for automatic focusing until each of photo-detector means receives a substantially equal amount of light radiated from a light emitting element and reflected from the subject to be photographed. The apparatus further includes a radiance control means for controlling the light energy emitted from the right emitting element in such a way that it radiates a diminished light energy for a predetermined period of time from initiation of measurement and then restores its light energy from the diminution condition after the elapse of the period of time. According to the present invention, the light energy emitted from the light emitting element is reduced into a fixed period diminution condition by means of the radiance control element, and then restored to enhance light energy from the diminution condition following the elapse of the period, thus making possible the carrying out of fine focusing operations with precision and stability over a wide range of distance from near to far.

BRIEF DESCRIPTION OF THE DRAWINGS

The objects and features of the present invention will become more apparent from a consideration of the following detailed description taken in conjunction with the accompanying drawings in which.

DETAILED DESCRIPTION OF THE PREFERRED EMBODIMENTS

Figure 4:
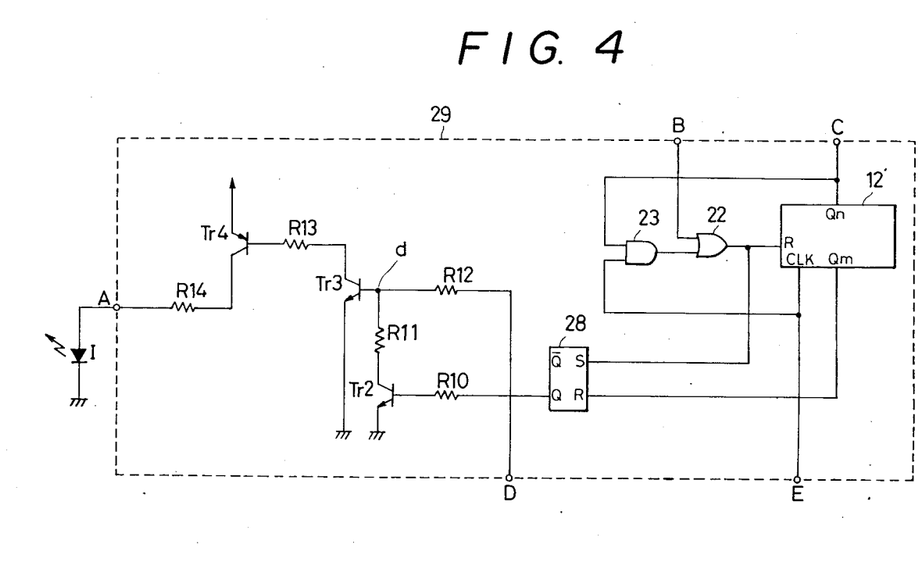
FIG. 4 is a circuit diagram of the main elements of the auto-focus adjustment apparatus of the present invention.

FIG. 4 shows a first embodiment of the present invention in which a block 29 replaces the block 19 of the apparatus in the prior art as shown in FIG. 2, and since the arrangement of the units and parts other than the block 29 is identical to those shown in FIG. 2, a description of those portions will be omitted and the block 29 only will be fully described.

The connection point B is connected to the one input terminal of an OR-gate 22 which is similar to that in the prior art, and the output of the OR-gate 22 is connected to the reset terminal of a counter 12', and the set terminal of a RS flip-flop 28.

This counter 12', similar in manner to the prior art, operates according to the fall of the clock pulse output by the reference oscillator 13. The reference oscillator 13 is connected through connection point E to the clock input of the counter 12', and to the input terminal of the AND-gate 23 of the bolck 29. The output of the AND-gate 23 is connected to the other input terminal of the OR-gate 22.

The output Qn of the counter 12' and the connection point C are connected to the input terminal of the AND-gate 23.

The output Qn of the counter 12' resets the D flip-flops 18 and 19 via connection point C in a manner similar to that in the prior art, and is concurrently connected to the top input of the OR-gate 24.

In addition to the output Qn, an output Qm satisfying the condition Qn>Qm is provided in the counter 12', and the output Qm is connected to the reset terminal of the RS flip-flop 28.

The non-inverting output of the RS flip-flop 28 is connected to the base of transistor Tr2 through a resistor R10.

The emitter of the transistor Tr2 is connected to ground and its collector is connected through a resistor R11 to the base of a transistor Tr3 and to a resistor R12. The other end of the resistor R12 is connected to a connection point D which is applied with a signal from the reference oscillator 13 which is similar to that of the prior art.

The emitter of the transistor Tr3 is connected to ground and its collector is connected to the base of a transistor Tr4 through a resistor R13. A positive voltage is applied to the emitter of the transistor Tr4, and its collector is connected via the resistor 14 and through the connection point A to the anode of the power supply I in a manner similar to that of the prior art.

With such an arrangement, when one or the other of the outputs VA and VB of the integrators 4A and 4B reaches the voltage VH, the positive pulse which appears at the point B, as described above, resets the counter 12' via the OR-gate 22, and concurrently, the non-inverting output of the RS flip-flop 28 becomes high level, and turns the transistor Tr2 into an On state via the resistor R10.

In this case, when the point D lies at high level by the signal from the reference oscillator 13, the resistors R12 and R11 are serially connected to divide the electrical potential of a point d, and the electrical current of the base of the transistor Tr3 decreases below that of a case in which the transistor Tr2 is in an OFF condition. Accordingly, the electrical current of the base of the transistor Tr4 also decreases, according to which the radiant energy of the light emitting element I also decreases. In other words, radiation becomes even weaker than when the transistor Tr2 is OFF.

As the predetermined time period (tA in FIG. 7) elapses, and when the electrical potential of the point B is in a low level condition without either of the outputs VA and VB of the integrators 4A and 4B having reached the voltage VH, the output Qm of the counter 12' becomes high level. Accordingly, the RS flip-flop 28 is reset, its non-inverting output becomes low level, and the transistor Tr2 goes to OFF.

As a result, the light emitting element I brightens and begins to emit a strong light signal. (Bright time period tB in FIG. 7).

In the event that a photo-subject is in close range, radiation is done initially with a weak emission with which the reflected light is received by the photodiodes DA and DB. Thus, the problem of saturation of the output of the amplifiers 1A and 1B due to high radiation intensity is solved. Further, when the predetermined time period elapses, the element I brightens making accurate range finding possible without any problem, even if the intensity of the light reflected from a distant photo-subject is weak.

Figure 7:
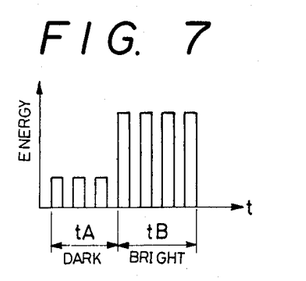
FIG. 7 is a graph explaining the operation of an embodiment of the present invention.

The diminution period tA can be predetermined at a length which will not cause the above stated amplifier output saturation problem.

Figure 6:
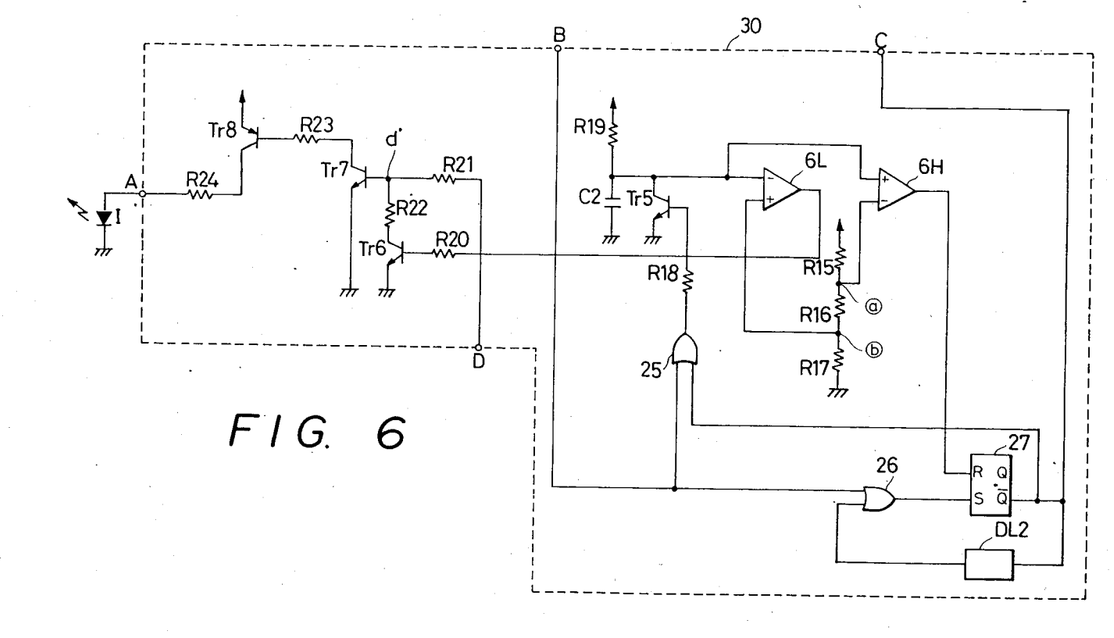
FIG. 6 is a circuit diagram of the main elements of another embodiment of the present invention.

FIG. 6 shows a different embodiment of the present invention in which a block 30 replaces the block 19' of the prior art shown in FIG. 5. Since the arrangement of the units and parts other than the block 30 is identical to those shown in FIG. 5, only the block 30 will be described fully.

The connection point B is connected, in a manner similar to the prior art, to the left and top inputs of the OR-gates 25 and 26, respectively, and the output of the OR-gate 25 is connected through a resistor R18 to the base of a transistor Tr5.

The output of the OR-gate 26 is connected to the set terminal of the RS flip-flop 27, and the inverting output of the RS flip-flop 27 is connected to right input of the OR-gate 25, to the point C, and concurrently through the delay circuit DL2 to the other input of the OR-gate 26.

The non-inverting input of the comparator 6H is connected to the inverting input of a comparator 6L, the collector of a transistor Tr5, and to the connection point of a capacitor C2 and a resistor R19. The emitter of the transistor Tr5 is connected to ground. The other end of the resistor R19 is connected to power supply voltage and the other end of the capacitor C2 is connected to ground.

The connection point of resistors R15 and R16 which function to divide power supply voltage is connected to the inverting input of the comparator 6H, and the connection point of resistors R16 and R17 is connected to the non-inverting iuput of the comparator 6L. The other end of the resistor R17 is connected to ground.

The output of the comparator 6H is connected to the reset terminal of the RS flip-flop 27, and the output of the comparator 6L is connected through a resistor R20 to the base of a transistor Tr6.

The connection point of resistors R21 and R22 is connected to the base of a transistor Tr7, and the other end of the resistor R21 is connected to the connection point D which is applied with a signal from the reference oscillator 13. The other end of the resistor R22 is connected to the collector of the transistor Tr6, and the emitter of the transistor Tr6 is connected to ground.

The collector of the transistor Tr7 is connected through a resistor R23 to the base of a transistor Tr8, and the emitter of the transistor Tr7 is connected to ground.

Power supply voltage is applied to the emitter of the transistor Tr8, and its collector is connected through a resistor R24 and the connection point A to the anode of the light emitting element I, the cathode of which is connected to ground.

Considering the connection point of the resistors R15 and R16 as point (a), and the connection point of the resistors R16 and R17 as point (b) in the above mentioned arrangement, the electrical potential at point (a) is greater than the electrical potential at point (b).

Figure 8:
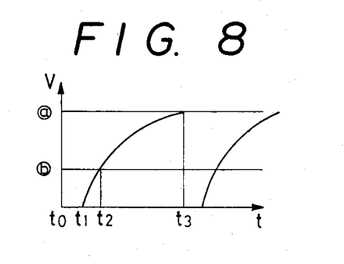
FIG. 8 is a graph explaining the operation of another embodiment of the present invention.

As FIG. 8 shows, the transistor Tr5 is turned ON by the output of the OR-gate 25 during the time period t0-t1, whereupon the capacitor C2 discharges. At this time, the inverting input of the comparator 6L has virtually a grounded electrical potential, and the non-inverting input of the comparator 6L has come to have the electrical potential of the point (b), thus the output of the comparator 6L is high level, and the transistor Tr6 is turned ON.

At the time when the point D applied with the signal from the reference oscillator 13 is high level, the resistors R21 and R22 are serially connected to divide the electrical potential of the point d', and the electrical current of the base of the transistor Tr7 decreases below the case in which the transistor Tr6 is turned OFF. Accordingly, the electrical current of the base of the transistor Tr8 also decreases, according to which the radiance of the light emitting element I becomes even weaker than when the transistor Tr6 is turned OFF.

Even if the capacitor C2 begins to charge and integration advances during the period of time t1-t2, the electrical potential of the non-inverting input of the comparator 6L is higher than the electric potential of the inverting input of the comparator 6L, and the output of the comparator 6L remains at high level, and the diminished radiance of the light emitting element I remains unchanged.

Passing the time t2, when the electrical potential of the inverting input of the comparator 6L becomes higher than the electrical potential of the non-inverting input of the comparator 6L, the output of same inverts to low level, the transistor Tr6 goes to OFF, and accordingly the light emitting element I brightens.

In a manner similar to the embodiment described above, initial radiation to a photo-subject is made with weak radiance, thus in the event that a photo-subject is in close range, it is possible to perform range finding without inducing saturation of the outputs of the amplifiers. Further, even when a photo-subject is at a great distance and reflected light is weak, when the predetermined time period (determined by the time constant of the resistor R19 and the capacitor C2, and the resistors R15, R16 and R17) elapses, the light emitting element I brightens, and accurate range finding becomes possible.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

We claim:

1. An automatic focus adjustment apparatus adapted for use with photographic or video cameras comprising:
   a light emitting element for radiating light to a subject to be photographed;
   a pair of photo-detector means;
   an optical system for directing into said pair of photo-detector means the reflected light portion of the light radiated from said light emitting element to said subject to be photographed;
   an imaging optical system for imaging said subject;
   an automatic focusing means for shifting said imaging optical system along its optical axis in response to an output signal from said pair of photo-detector means for automatic focusing until each of said pair of photo-detector means receives a substantially equal amount of light reflected from said subject to be photographed; and
   a radiance control means for controlling the light energy emitted from said light emitting element in such a way that it radiates a diminished light energy for a predetermined period of time from initiation of measurement and then restores said light energy from the diminution condition after the elapse of said predetermined period of time.

* * * * *